US009042551B2

United States Patent
Fifield et al.

(10) Patent No.: US 9,042,551 B2
(45) Date of Patent: May 26, 2015

(54) ELECTRONICALLY PROGRAMMABLE FUSE SECURITY ENCRYPTION

(75) Inventors: John A. Fifield, Underhill, VT (US); Gerald P. Pomichter, Jr., Fairfax, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 13/487,336

(22) Filed: Jun. 4, 2012

(65) Prior Publication Data

US 2013/0321066 A1 Dec. 5, 2013

(51) Int. Cl.
| | |
|---|---|
| H01H 37/76 | (2006.01) |
| H04L 9/16 | (2006.01) |
| H04L 9/08 | (2006.01) |
| H04L 9/28 | (2006.01) |
| G06F 21/62 | (2013.01) |
| G06F 21/60 | (2013.01) |
| G06F 12/14 | (2006.01) |
| G11C 17/16 | (2006.01) |

(52) U.S. Cl.
CPC .. *H04L 9/16* (2013.01); *H04L 9/08* (2013.01); *H04L 9/28* (2013.01); *H01H 37/76* (2013.01); *G06F 21/62* (2013.01); *G06F 21/602* (2013.01); *G06F 12/1408* (2013.01); *G11C 17/16* (2013.01)

(58) Field of Classification Search
None
See application file for complete search history.

(56) References Cited

U.S. PATENT DOCUMENTS

| | | | |
|---|---|---|---|
| 5,081,675 A * | 1/1992 | Kittirutsunetorn | 713/190 |
| 5,384,847 A | 1/1995 | Hendrickson et al. | |
| 5,563,950 A | 10/1996 | Easter et al. | |
| 5,799,080 A | 8/1998 | Padmanabhan et al. | |
| 6,445,606 B1 | 9/2002 | Khoury | |
| 6,641,050 B2 | 11/2003 | Kelley et al. | |
| 6,792,528 B1 | 9/2004 | Hou | |
| 7,114,082 B2 | 9/2006 | Klein | |
| 7,185,208 B2 | 2/2007 | Gorobets | |
| 7,197,594 B2 | 3/2007 | Raz et al. | |
| 7,461,268 B2 | 12/2008 | Drehmel et al. | |
| 7,747,025 B1 * | 6/2010 | Trimberger | 380/284 |
| 2003/0065931 A1 * | 4/2003 | Nakai et al. | 713/193 |
| 2007/0172053 A1 * | 7/2007 | Poirier | 380/28 |
| 2008/0005586 A1 * | 1/2008 | Munguia | 713/189 |
| 2008/0181407 A1 * | 7/2008 | Ceskutti et al. | 380/277 |
| 2010/0005317 A1 | 1/2010 | Pribadi et al. | |
| 2010/0049906 A1 | 2/2010 | Tao | |
| 2010/0070681 A1 | 3/2010 | Wan et al. | |
| 2010/0070682 A1 | 3/2010 | Wan et al. | |
| 2012/0011373 A1 * | 1/2012 | Hakkarainen et al. | 713/193 |

FOREIGN PATENT DOCUMENTS

JP 2001265658 9/2001

\* cited by examiner

*Primary Examiner* — Andrew Nalven
*Assistant Examiner* — Christopher Ruprecht
(74) *Attorney, Agent, or Firm* — David Cain; Roberts Mlotkowski Safran & Cole, P.C.

(57) ABSTRACT

A semiconductor structure including a device configured to receive an input data-word. The device including a logic structure configured to generate an encrypted data-word by encrypting the input data-word through an encrypting operation. The device further including an eFuse storage device configured to store the encrypted data-word as eFuse data by blowing fuses in accordance with the encrypted data-word.

13 Claims, 5 Drawing Sheets

US 9,042,551 B2

ELECTRONICALLY PROGRAMMABLE FUSE SECURITY ENCRYPTION

FIELD OF THE INVENTION

The invention relates to electronically programmable fuse (eFuse) devices and, more particularly, to systems and methods for encrypting and decrypting data on eFuse devices.

BACKGROUND

An eFuse is a simple circuit element that has one of two different states: blown or unblown. As is generally known in the art, data may be written to eFuses by selectively blowing eFuses in an array of eFuses where the blown and unblown eFuses correspond to "1"s and "0"s.

For example, many integrated circuit chips use arrays of eFuses to store redundancy information and records of manufacturing, such as wafer identification. Specific chip designs also use arrays of eFuses to store proprietary software code, passwords, and classified information.

However, data in an array of eFuses is not secure and can be accessed through at least two methods. First, the state of an eFuse can be accessed by monitoring the current that is conducted through that eFuse. While there are known methods of making it more difficult to measure the current across an eFuse, these methods can be overcome. Second, the state of an eFuse can be accessed through optical, thermal, or photonic inspection of the eFuse. Again, while there are known methods of making this inspection more difficult, these methods can be overcome.

Accordingly, there exists a need in the art to provide more security to eFuse arrays and overcome the deficiencies and limitations described hereinabove.

BRIEF SUMMARY

In a first aspect of the invention, a semiconductor structure is provided including a device configured to receive an input data-word. The device including a logic structure configured to generate an encrypted data-word by encrypting the input data-word through an encrypting operation. The device further including an eFuse storage device configured to store the encrypted data-word as eFuse data by blowing fuses in accordance with the encrypted data-word.

In another aspect of the invention, a semiconductor structure is provided including an eFuse storage device configured to store an encrypted data-word. The semiconductor structure further including an encrypting logic structure. The semiconductor structure further including an encrypter output, which is an output of the encrypting logic structure. The encrypting logic structure generates the encrypter output by encrypting an input data-word based on an input key-word through an encrypting operation. The encrypter output is written to the eFuse storage device as the encrypted data-word during a write operation. The semiconductor structure further including a decrypting logic structure. The decrypting logic structure generates an output data-word by decrypting the encrypted data-word based on an output key-word through a decrypting operation. The output data-word is output by the semiconductor structure during a read operation.

In yet another aspect of the invention, a method is provided for including receiving an input data-word. The method further including receiving a key-word. The method further including encrypting the input data-word based on the key-word to generate an encrypted data-word. The method further including encrypting the input data-word based on the key-word to generate an encrypted data-word.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

The invention relates to eFuse devices and, more particularly, to systems and methods for encrypting and decrypting data on eFuse devices. More specifically, implementations of the invention provide a system and method to scramble incoming data, e.g., incoming data to be written to an array of eFuses, before the writing process for the fuse(s) occurs, and enable the descramble of the scrambled written eFuse data upon an authorize attempt to read the eFuse data.

In embodiments, an integrated circuit structure may be provided for encrypting and decrypting the data. In embodiments, the integrated circuit structure may be used with memory structures such as eFuse arrays to secure the stored data. For example, the eFuse array stores the encrypted data-word(s) and adds a layer of encryption to protect the data stored on the eFuse array from unauthorized access.

The layer of encryption may be provided by an encrypting logic structure, which converts input data as it enters the eFuse into an encrypted form based on at least one key-word. The encrypted form of the data is then written to the eFuse. A decoding logic structure converts the encrypted data from the eFuse back into unencrypted data using the same key-word(s). The unencrypted data can then be read from the eFuse. Therefore, the key-word(s) is required to write or read from the eFuse thereby restricting access to the data.

Further, in embodiments of the invention, the encryption method used by the encryption logic structure can be selected through the use of the key-word(s). The key-word(s) may then be used in combination with at least one code-word to provide the manner in which the data is encrypted. The same key-word(s) and code-word(s) would then be required to read out the correct unencrypted data from the eFuse.

Advantageously, the data security of an existing eFuse macro can be greatly improved by implementing the systems and methods described herein. Specifically, the stored physical data does not look like the actual data, so the actual data is protected even if the physical data is compromised.

Figure 1:
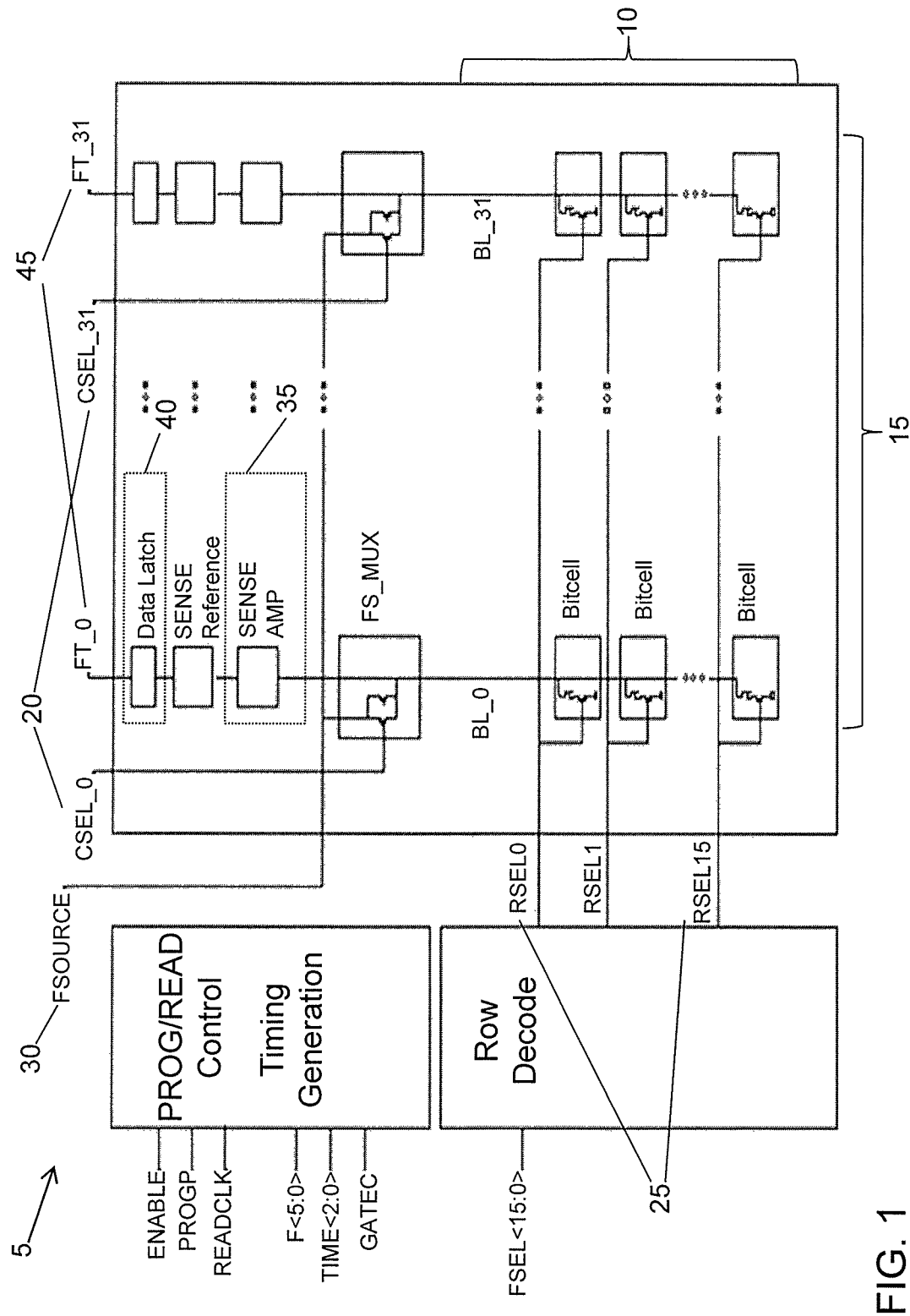
FIG. 1 shows an exemplary eFuse macro in accordance with aspects of the present invention.

FIG. 1 shows an exemplary eFuse macro 5 including eFuse data organized in a matrix of rows 10, e.g., sixteen rows, of fuse-words having columns 15, e.g., thirty two columns, or bits each. In the eFuse macro 5, a fuse-word of at least one bit, e.g., thirty-two bits, is programmed into a selected row by activation of column selects 20 (CSEL<31:0>) and row selects 25 (RSEL<x>). A program or write operation is performed when FSOURCE 30 is high and a selected column select 20 (CSEL<y>) is enabled, which allows programming current to flow through a selected fuse and blow the fuse. A fuse read operation is performed by enabling a selected row select 25 (RSEL<x>) and sensing all of the bits, e.g., thirty-two bits, in parallel with sense-amps 35. The sense-amps 35 output a digital value corresponding to respective fuse data located in the selected row address, e.g., row select 25 (RSEL<x>). After performing the sensing, the digital fuse data is stored in the data latches 40 and driven onto the output pins 45 (FT<31:0>).

The exemplary eFuse macro 5 shown in FIG. 1 may be enhanced in accordance with aspects of the invention to include an encrypting and decrypting apparatus (EDA), which will receive an input fuse data-word, scramble the data-word in association with a key-word during a write operation, and descramble the data-word during an authorized fuse read operation. The EDA includes encrypting logic structure, e.g., an arithmetic logic unit (ALU), that performs a logic and/or arithmetic scrambling operation on the incoming data-word as instructed by the key-word. Although, the ALU is to be understood as an arithmetic and logic unit, in alternative embodiments of the invention, a more simple application, e.g., a less secure application, of the ALU could include only arithmetic operations or only logical operations. Table 1 below provides a sample set of ALU operations that may be used in embodiments of the invention in which "K" is the key-word and "D" is the data-word.

TABLE 1

| Operation f(K,D) | Explained |
|---|---|
| K xor D | Bitwise xor |
| K xnor D | Bitwise xnor |
| Not D | Invert Data |
| (K >> x) xor D | Shift Key by x and xor with Data |
| K xor (D >> x) | Shift data by x and xor with Key |
| K + D | K plus D |
| K + not D | K minus D |
| Not K + D | D minus K |

In embodiments, the scrambling operation may be performed on the incoming data-word by the logical and/or arithmetic operations determined by the additional input from the one or more instruction words (e.g., the key-word) and optionally one or more additional code-words. For example, the EDA may be configured to operate with two or three inputs. In a first instance, the EDA may utilize a first input including an input data-word containing the data to be fused into the eFuse macro and a second input including an instruction word or key-word that may describe particular ALU functions to be performed on the input data-word. In a second instance, the EDA may utilize a first input including an input data-word containing the data to be fused into the eFuse macro, a second input including an instruction word or key-word that may describe particular ALU functions to be performed on the input data-word, and a third input including a code-word containing a data pattern, which may be arithmetically or logically combined with the data-word using the ALU functions instructed by the key-word. Table 2 below describes six examples of an EDA receiving key-words and code-words from various sources for implementation within aspects of the invention.

TABLE 2

| Example # | Key-word source | Code-word source |
|---|---|---|
| 1 | External | External |
| 2 | External | Internal |
| 3 | Internal | External |
| 4 | Internal | Internal |

TABLE 2-continued

| Example # | Key-word source | Code-word source |
|---|---|---|
| 5 | External | not used |
| 6 | Internal | not used |

Based on application needs, e.g., high security concerns versus low security concerns, there are several options for the manner in which the key-word and code-word may be stored with respect to the eFuse macro. For example, an external key-word or code-word may come from a source external to the eFuse macro, e.g., from a hard wired vector located on-chip or off-chip. The key-word may also come from a register located on-chip, or from a logic block designed to obfuscate the digital value of the key-word. An internal key-word or code-word may come from a location within the eFuse macro. For example, specific data-locations within the eFuse macro may be reserved to store the key-word and code-word used to encode the one or more data-words.

Figure 2:
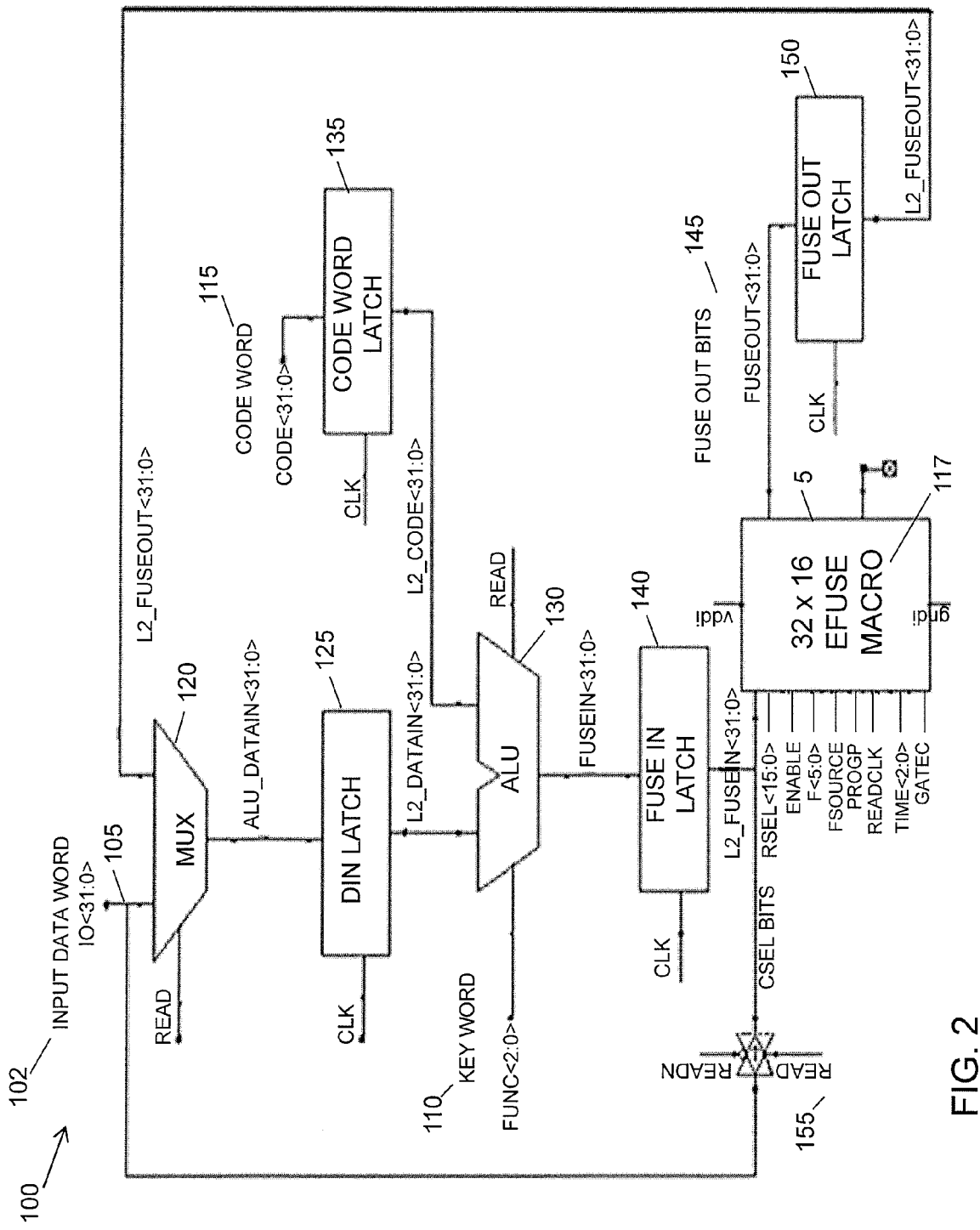
FIG. 2 shows a secure eFuse device in accordance with aspects of the present invention.

FIG. 2 shows a circuit schematic for a secure eFuse device in accordance with aspects of the invention. Specifically, FIG. 2 shows an EDA device 100 configured to receive an input data-word 102 from an input data-word bus 105, and during a write operation, scramble the input data-word 102 using arithmetic and/or logic operations as instructed by a key-word 110 and a code-word 115 into eFuse data 117, and during an authorized read operation, descramble the eFuse data 117 back into the input data word 102.

In the write operation (e.g., a scramble operation), the data-word 102 is received and directed through input multiplexer (MUX) device 120, which selects one of several input signals, e.g., L2_FUSEOUT<31:0> or INPUT DATA WORD, and forwards the selected input into a single line. Thereafter, the selected input may be optionally stored in a latch 125 prior to processing by the ALU 130. The selected input, e.g., the data-word 102, is a first input received by the ALU 130 for further processing. The code-word 115 is a second input received by the ALU 130 from an internal or external source as described above. The code-word may be optionally stored in a latch 135 prior to processing by the ALU 130. The key-word 110 is a third input received by the ALU 130 from an internal or external source as described above.

In accordance with aspects of the invention, the key-word 110 describes particular ALU functions, e.g., arithmetic and/or logic operations, to be performed on the data-word 102. For example, in this instance the key-word 110 has a 3-bit field, which is used to select one of a plurality of ALU operations. In this instance, an add operation is chosen, and the data-word 102 and the code-word 115, e.g., the first and the second inputs, are added together by the ALU 130 to generate ALU output bits. Thereafter, the ALU output bits may be optionally stored in a latch 140. The ALU output bits are received by the eFuse macro 5 and used to drive the column select or CSEL bits of the eFuse macro 5, as described above with respect to FIG. 1. The ALU output bits may be programmed into a selected row (e.g., an address) of the eFuse macro 5 by selection of an RSEL<15:0> address bit, as also described above with respect to FIG. 1. Advantageously, the stored physical data (e.g., the eFuse data) does not look like the actual data (e.g., the input data-word) so the actual data is protected even if the physical data is compromised.

In the read operation (e.g., a descramble operation), a read signal triggers the encoded eFuse data 117 to be sensed by the eFuse macro 5, as described above with respect to FIG. 1, and output as eFuse data bits 145. The eFuse data bits 145 may be optionally stored in a latch 150 and/or used as input for the MUX 120. In the read operation, the MUX 120 selects eFuse data bits 145 as a first input for the ALU 130. The read signal also directs the ALU 130 to perform an inverse arithmetic and/or logical operation as determined by the key-word 110, e.g., the third input, which in this instance is a subtraction function. Therefore, the code-word 115, e.g., the second input, is subtracted from the eFuse data bits 145 and the resultant may be optionally stored in latch 140. The read signal also activates a gate or driver 155, e.g., a pass-gate or tri-state driver, which drives the descrambled eFuse data back onto the input-data word bus 105.

Figure 3:
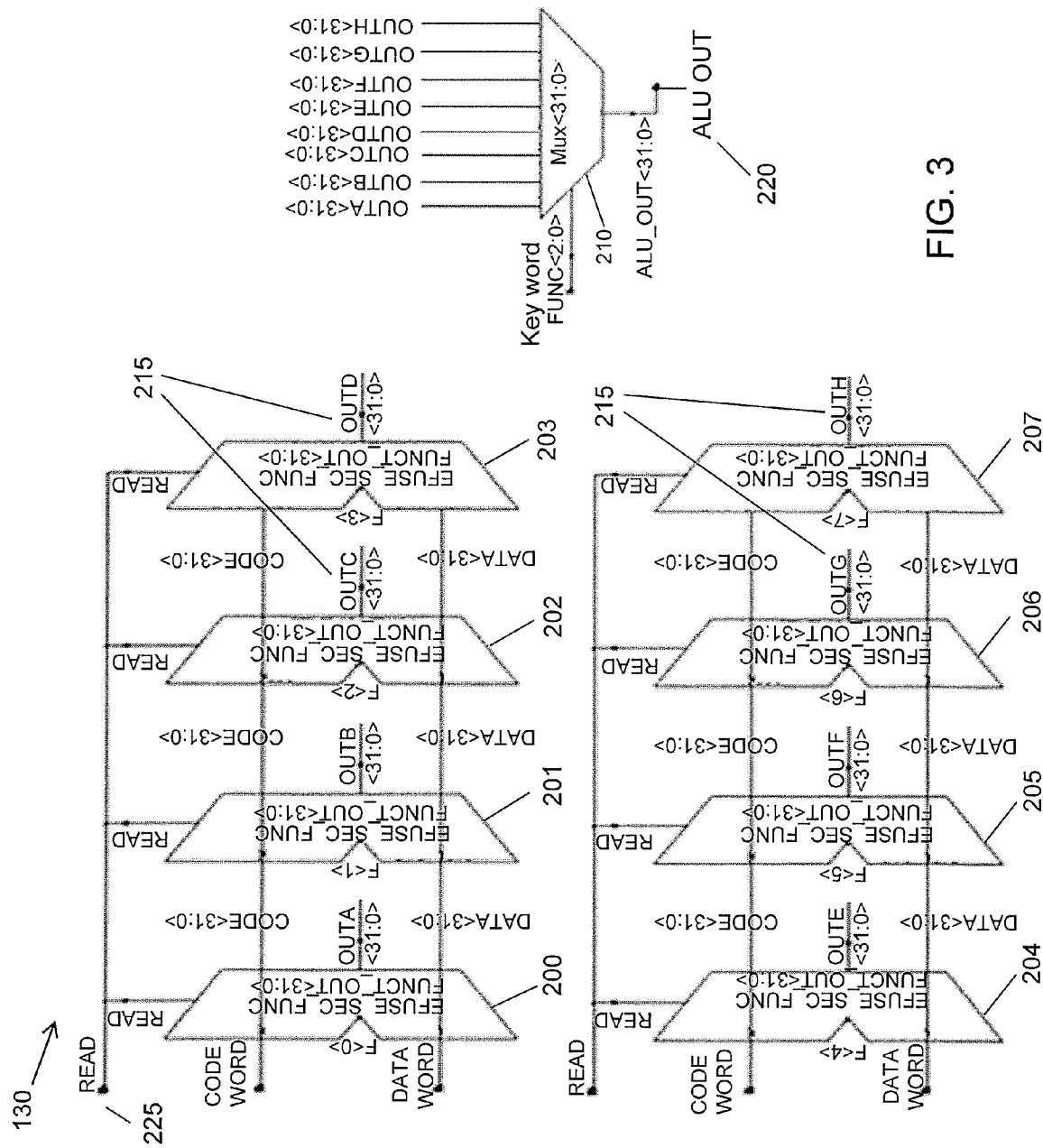
FIG. 3 shows an arithmetic logic unit circuit for use as an encrypter/decrypter in the secure eFuse device in accordance with aspects of the present invention.

In the above-described example, a thirty-two bit eFuse word was scrambled with a thirty-two bit code word using an addition function and only descrambled with a subtraction function when an authorized read out operation was performed through the EDA/ALU. However, one of ordinary skill in the art would understand that aspects of the invention could be implemented using any various bit sizes in combinations with any number and combinations of various arithmetic and/or logic functions. For example, FIG. 3 provides further details of a configurable ALU device 130, which can perform eight different ALU operations as decoded by a 3-bit key-word.

Specifically, the ALU device 130 may be comprised of eight sub sections 200-207 each performing a different ALU function, e.g., an arithmetic and/or logic operation. Table 3 below shows an exemplary list of functions that the ALU device 130 may perform in a write operation and a corresponding inverse function in a read operation.

TABLE 3

| Operation | Write operation | Read operation |
|---|---|---|
| A | C xor D (C is code-word and D is the input data-word) | C xor F (F is eFuse or physical fuse data) |
| B | C xnor D | C xnor F |
| C | not D | not F |
| D | (C >> x) xor D | (C >> x) xor F |
| E | C xor (D >> x) | (C xor F) << x |
| F | D + C | F − C |
| G | not D + C | not (F − C) |
| H | D + not C | F − not C |

The configurable ALU device 130 receives the first selected input as described above with respect to FIG. 2, from the data-word 102, and the eight different ALU operations may be performed on the selected input by sub sections 200-207 corresponding to the functions exemplified in Table 3. A MUX 210 or function select block determines which of the eight scrambled data words, OUT-A to OUT-G 215, is driven onto the ALU-OUT lines 220. The read input 225 and/or the key-word 110, as discussed above with respect to FIG. 2, are used to choose the scramble operation during a write operation, and the descramble operation during a read operation. For example, if a shift right operation is performed in a write operation, then a shift left operation, e.g., an inverse function, will be performed in a read operation. Likewise, if an addition function is performed in a write operation, then a subtraction function will be performed in a read operation to descramble the data-word.

In embodiments, it may also be possible to perform more than one ALU function on the data-word to scramble the data-word. Specifically, successive ALU operations could be performed on the data-word to encode and decode the data-word. The successive ALU operation could potentially increase the data security of the data-word. For example, a shift operation could be performed on the data-word, and then an XOR operation, and then an addition operation performed, in accordance with a code-word as shown in entries D-F from Table 3.

Some arithmetic and logic operations, such as a shift, can be performed without the use of the code-word, as shown in Tables 1 and 2. Therefore, in embodiments, as shown in Tables 1 and 2, a code-word may not be used at all to encrypt the data-word. Accordingly, with respect to FIGS. 2 and 3, the ALU 130 would only receive two pieces of input data comprising the data-word 102 and the key-word 110 for performing the write and read operations.

A should be understood by one of ordinary skill in the art, encoding blank data-word fields with a single code-word should be avoided because it could make it easier to discover the encoding method by exposing several rows of identical physical data. The data security may be enhanced further by choosing a different code-word for each data-word such that an all "0" field, for example, will not produce the same encoded, or physical pattern.

In embodiments, the key-word determining the ALU operation may be derived from the selected row address where the data-word is to be stored in the eFuse macro. In other words, the fuse address may be used to select the ALU function. For example, in an instance where several consecutive data-words consist of all "0"s, if the same ALU operation is performed on the data-word and the code-word combination, the physical data pattern fused into the eFuse array for several fuse rows would be identical, making it easier to compromise the encoding technique. If, however, the ALU operation is a function of the row address of each data-word, the physical eFuse data pattern for each of the consecutive rows would be different, making it more difficult to understand the encoding method.

The following 8-bit word example in Table 4 illustrates the above instance. If a code-word (C) and data-word (D) are operated on by four different ALU operations, which are determined by a function of the numeric row address, the common data-word "00000000" is encoded into 4-distinct physical data patterns making it more difficult to observe an encoding pattern.

TABLE 4

| Code (C) = 01101010 Data (D) = 00000000 | | |
|---|---|---|
| Address | Write operation | Fuses Blown |
| 0 | Operation f(C,D) = C xor D | 01101010 |
| 1 | Operation f(C,D) = C << 1 xor | 00101011 |
| 2 | Operation f(C,D) = C + ~D | 01101001 |
| 3 | Operation f(C,D) = C >> 4 xor D | 10100110 |

Figure 4:
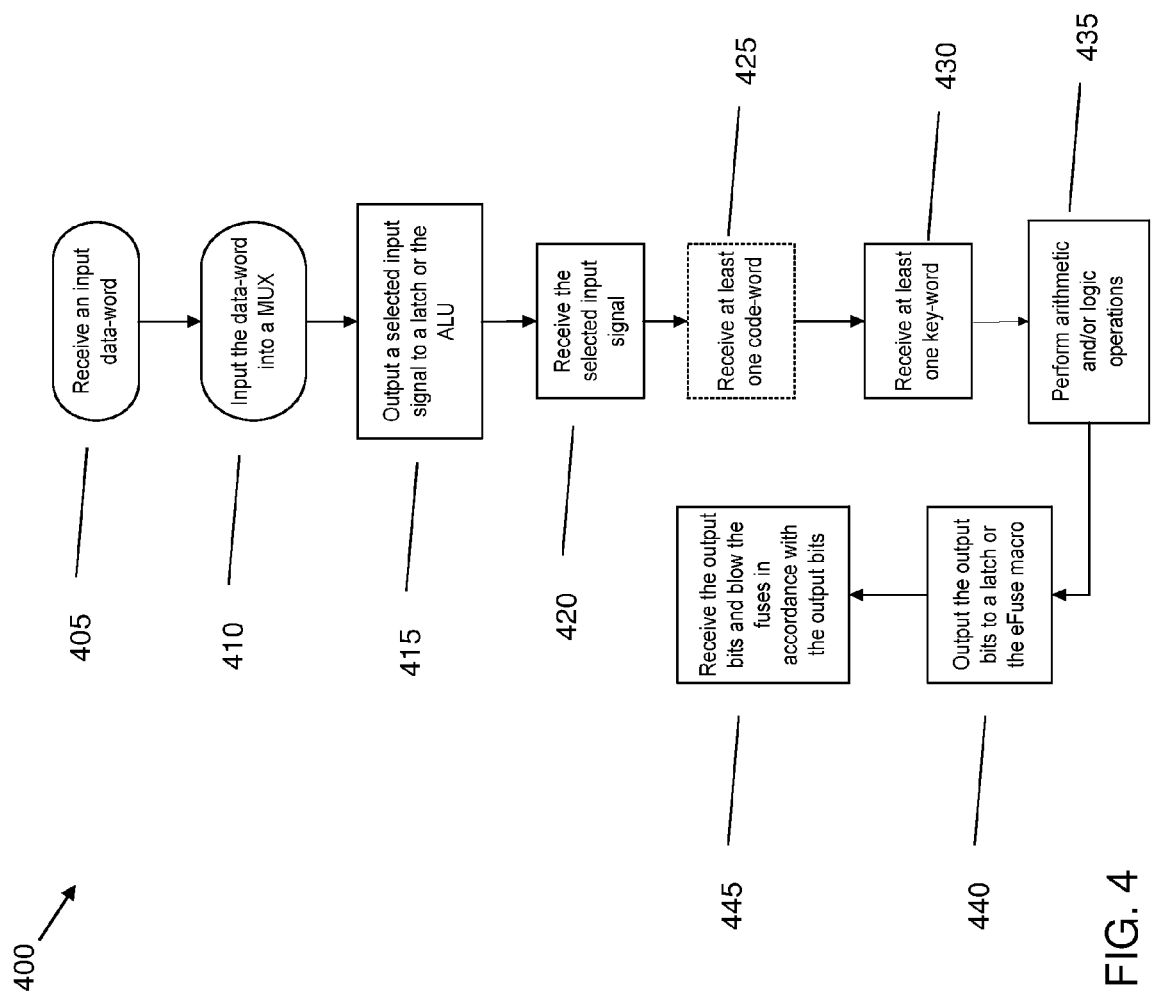
FIGS. 4 and 5 are flow diagrams of processes in accordance with aspects of the invention.
Figure 5:
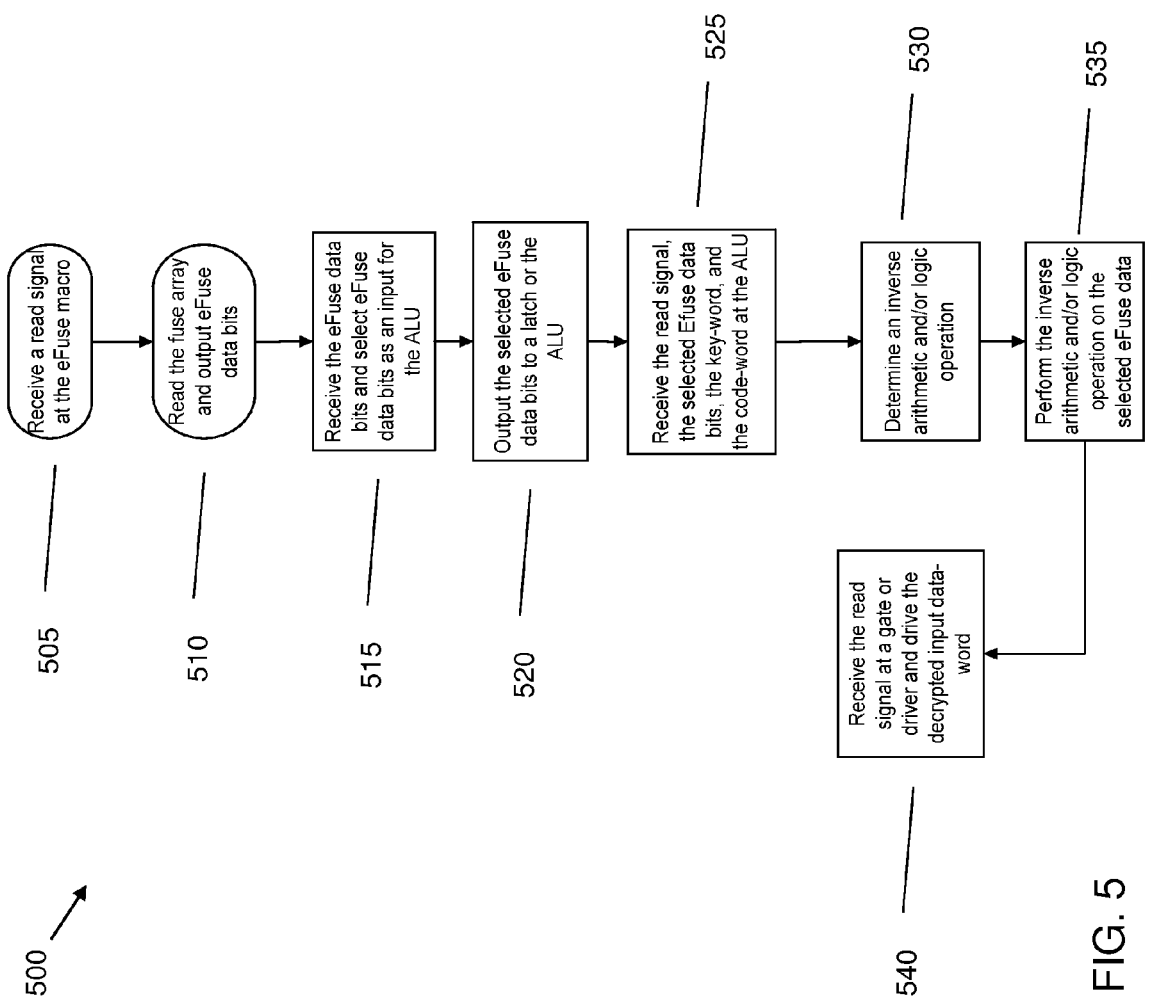

FIGS. 4 and 5 show exemplary flows for performing aspects of the present invention. The steps of FIGS. 4 and 5 may be implemented to encrypt and decrypt an input key-word utilizing the structures discussed in FIGS. 1-3. The flowcharts and block diagrams in FIGS. 4 and 5 illustrate the architecture, functionality, and operation of possible implementations of systems and methods according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 4 depicts an exemplary flow for a write operation 400 including the encrypting of an input key-word. At step 405, an input data-word is received from an input-data word bus. At step 410, the data-word is input into a MUX, which selects one of several input signals corresponding the data-word. At step 415, the MUX outputs the selected input signal to either a latch for data storage or the ALU for further processing. At step 420, the ALU receives the selected input signal from the MUX or the latch. The selected input signal is a first input for the ALU. At step 425, the ALU optionally receives at least one code-word from an internal or external source. The at least one code-word is optionally a second input for the ALU. At step 430, the ALU receives at least one key-word from an internal or external source. The at least one key-word is a second or third input for the ALU depending on whether the at least one code-word is received as an optional input.

In accordance with aspects of the invention, the key-word describes particular ALU functions, e.g., arithmetic and/or logic operations, to be performed on the data-word, as discussed above with respect to Tables 1-3. The code-word includes a data pattern, which may be arithmetically or logically combined with the data-word using the ALU functions instructed by the key-word, as discussed above with respect to Tables 2-3.

At step 435, the arithmetic and/or logic operations are performed on the key-word by the ALU in accordance with the received at least one key-word and the at least one code-word. For example, in this instance the key-word may be used to select the add operation whereby the data-word and the code-word, e.g., the first and the third inputs, are added together by the ALU to generate ALU output bits. As step, 440, the ALU outputs the output bits to either a latch for data storage or the eFuse macro for use in blowing the fuses. At step 445, the eFuse macro receives the output bits from either the latch or the ALU and blows the fuses in accordance with the received output bits. For example, the output bits are used to drive the column select the eFuse macro, as described above with respect to FIG. 1, and are programmed into a selected row of the eFuse macro by selection of an address bit. Advantageously, the eFuse data does not look like the input data-word because of the encrypting process so the input data is protected even if the eFuse data is compromised.

FIG. 5 depicts an exemplary flow for a read operation 500 including the decrypting of eFuse data. At step 505, a read signal is received by the eFuse macro. At step 510, the fuse array is read and output as eFuse data bits, as described above with respect to FIG. 1. The eFuse data bits may be output to a latch for data storage or to the MUX for further processing. At step 515, the MUX receives the eFuse data bits and selects the eFuse data bits as a first input for the ALU. At step 520, the MUX outputs the selected eFuse data bits to either a latch for data storage or to the ALU for further processing.

At step, 525, the ALU receives the read signal, the selected eFuse data, the key-word, and optionally the code-word. At step 530, an inverse arithmetic and/or logic operations is determined by the key-word. At step 535, the inverse operation is performed on the selected eFuse data using the key-word and optionally the code-word. For example, in this instance the key-word may be used to select the inverse of the addition operation (e.g., subtraction) whereby the eFuse data and the code-word are subtracted from one another by the ALU to generate the original input data-word. Thus, eFuse data is decrypted back into the original input data-word. At step 540, the read signal activates a gate or driver, which drives the decrypted input data-word onto the input-data word bus from the ALU or optionally a latch.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A semiconductor structure comprising:
    a device configured to receive at least one input data-word, the device comprising:
        a logic structure configured to:
            receive at least one key-word, wherein each key-word is configured to instruct the logic structure on a different predefined number and combination of one or more encrypting operations that are to be performed on each respective input data-word, wherein each key-word is derived as a function of a selected eFuse row address where each respective input data-word is to be stored after encryption;
            receive at least one code-word, wherein each code-word is a data pattern configured to combine with each respective input data-word using the one or more encrypting operations instructed by each respective key-word, and wherein each code-word is different for each respective input data-word; and
            generate at least one encrypted data-word by encrypting each input data-word using the data pattern of each respective code-word and the predefined number and combination of one or more encrypting operations instructed by each respective key-word; and
        an eFuse storage device configured to store each encrypted data-word as eFuse data at each respective selected eFuse row address by blowing fuses in accordance with each respective encrypted data-word, wherein a physical eFuse data pattern stored at each row is different based on each respective key-word and code-word.

2. The semiconductor structure of claim 1, wherein the at least one key-word is received from a storage device external or internal to the semiconductor structure.

3. The semiconductor structure of claim 1, wherein the at least one code-word is received from a storage device external or internal to the semiconductor structure.

4. The semiconductor structure of claim 1, wherein:
    the logic structure is further configured to generate an output data-word by decrypting eFuse data stored at a particular eFuse row address through one or more decrypting operations;
    the input data-word is the same as the output data-word; and
    the one or more decrypting operations are an inverse of the predefined number and combination of one or more encrypting operations instructed by the key-word corresponding to the particular eFuse row address.

5. A semiconductor structure comprising:
an eFuse storage device configured to store at least one encrypted data-word;
an encrypting logic structure;
an encrypter output, which is an output of the encrypting logic structure,
  wherein the encrypting logic structure generates the encrypter output by encrypting each input data-word based on an input key-word and an input code-word,
  wherein each input key-word is configured to instruct the encrypting logic structure on a different predefined number and combination of one or more encrypting operations that are to be performed on each respective input data-word in succession to obtain the encrypter output;
  wherein each of the one or more encrypting operations is at least one of an arithmetic and logic operation;
  wherein each input key-word is derived as a function of a selected row address, which is configured to access a location in the eFuse storage device where the encrypter output is to be written;
  wherein each input code-word is a data pattern configured to combine with each respective input data-word using the one or more encrypting operations instructed by each respective key-word, and wherein each code-word is different for each respective input data-word; and
  wherein the encrypter output is written to the eFuse storage device as at least one encrypted data-word during a write operation by blowing fuses in accordance with each respective encrypted data-word at each respective selected eFuse row address, wherein a physical eFuse data pattern stored at each row is different based on each respective input key-word and input code-word; and
a decrypting logic structure,
  wherein the decrypting logic structure generates an output data-word by decrypting an encrypted data-word stored at a particular row address based on an output key-word and an output code-word through one or more decrypting operations chosen based on the output key-word, wherein the output key-word is derived as a function of the particular row address, and
  wherein the output data-word is output by the semiconductor structure during a read operation.

6. The semiconductor structure of claim 5, wherein the input key-word is the same as the output key-word, and wherein the input code-word is the same as the output code-word.

7. The semiconductor structure of claim 5, wherein the encrypting logic structure and the decrypting logic structure comprise a same logic structure.

8. The semiconductor structure of claim 5, wherein the input key-word is set internal to the semiconductor structure.

9. The semiconductor structure of claim 5, wherein the input key-word is set external to the semiconductor structure.

10. The semiconductor structure of claim 5, wherein:
the encrypting logic structure comprises a first arithmetic logic unit (ALU);
the first ALU comprises a first data input, a second data input, and an operation input;
the decrypting logic structure comprises a second ALU;
the second ALU comprises a first data input, a second data input, and an operation input;
the input data-word is connected to the first data input of the first ALU and the output data-word is connected to the first data input of the second ALU;
the input key-word is connected to the operation input of the first ALU and the output key-word is connected to the operation input of the second ALU;
the input code-word is connected to the second data input of the first ALU and the output code-word is connected to the second data input of the second ALU;
the operation input of the first ALU is set to the one or more encrypting operations;
the operation input of the second ALU is set to the one or more decrypting operations; and
the one or more decrypting operations is at least one of an arithmetic and logic inverse operation of the one or more encrypting operations.

11. A method comprising:
receiving at least one input data-word;
receiving at least one key-word, wherein each key-word is configured to instruct the logic structure on a different predefined number and combination of one or more encrypting operations that are to be performed on each respective input data-word, wherein each key-word is derived as a function of a selected eFuse row address where each respective input data-word is to be stored after encryption;
receiving at least one code-word, wherein each code-word is a data pattern configured to combine with each respective input data-word using the one or more encrypting operations instructed by each respective key-word, and wherein each code-word is different for each respective input data-word;
encrypting each input data-word based on each respective key-word and code-word to generate at least one encrypted data-word; and
blowing fuses of an eFuse structure at each respective selected eFuse row address in accordance with each respective encrypted data-word to generate eFuse data, wherein a physical eFuse data pattern stored at each row is different based on each respective key-word and code-word.

12. The method of claim 11, wherein the encrypting comprises selecting the number and the combination of the one or more encrypting operations based on the key-word and performing the encrypting operation on the input data-word based on the key-word.

13. The method of claim 12, further comprising decrypting the eFuse data through a decrypting operation, wherein the decrypting operation is an inverse of the number and the combination of the one or more encrypting operations instructed by the key-word.

* * * * *